(12) United States Patent
Ryckman

(10) Patent No.: US 9,715,066 B2
(45) Date of Patent: Jul. 25, 2017

(54) DOUBLE-SIDED ORTHOGONAL GRATING OPTICAL COUPLER

(71) Applicant: Intel Corporation, Santa Clara, CA (US)

(72) Inventor: Judson D. Ryckman, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/757,888

(22) Filed: Dec. 24, 2015

(65) Prior Publication Data
US 2017/0184796 A1    Jun. 29, 2017

(51) Int. Cl.
| G02B 6/34 | (2006.01) |
| G02F 1/01 | (2006.01) |
| G02B 6/26 | (2006.01) |
| G02B 6/124 | (2006.01) |
| G02B 6/42 | (2006.01) |
| G02B 6/30 | (2006.01) |

(52) U.S. Cl.
CPC .............. *G02B 6/26* (2013.01); *G02B 6/124* (2013.01); *G02B 6/30* (2013.01); *G02B 6/34* (2013.01); *G02B 6/4286* (2013.01)

(58) Field of Classification Search
CPC ... G02B 6/26; G02B 6/30; G02B 6/34; G02B 6/124; G02B 6/4286
USPC ........................................ 385/1–3, 14, 31, 37
See application file for complete search history.

(56) References Cited

U.S. PATENT DOCUMENTS

| 5,790,730 A * | 8/1998 | Kravitz | G02B 6/30 385/14 |
| 7,340,114 B2 * | 3/2008 | Doi | G02F 1/0123 385/2 |
| 8,699,836 B2 * | 4/2014 | Doerr | G02B 6/12004 385/129 |
| 8,818,203 B2 * | 8/2014 | Ji | G02B 6/30 398/182 |
| 2004/0179781 A1 * | 9/2004 | Melikechi | G02B 6/12007 385/39 |

(Continued)

FOREIGN PATENT DOCUMENTS

| JP | EP 2680061 A1 * | 1/2014 | ............ G02F 1/035 |
| WO | WO2015062641 A1 | 5/2015 | |

OTHER PUBLICATIONS

Wissem Sfar Zaoui et al., "Bridging the gap between optical fibers and silicon photonic integrated circuits", Optics Express, vol. 22, No. 2, Jan. 2014, 10 pages.

(Continued)

*Primary Examiner* — Robert Tavlykaev
(74) *Attorney, Agent, or Firm* — Schwabe, Williamson & Wyatt, P.C.

(57) ABSTRACT

Embodiments herein relate to orthogonally coupling light transmitted from a photonic transmitter chip. An optical apparatus may include a splitter to split light from a light source into a first path and a second path, and a grating to receive light from the first path at a first side and light from the second path at a second side opposite the first side to transmit diffracted light from the first path and the second path in a direction orthogonal to the photonic transmitter chip. Other embodiments may be described and/or claimed.

25 Claims, 7 Drawing Sheets

(56) References Cited

U.S. PATENT DOCUMENTS

| | | | |
|---|---|---|---|
| 2006/0133713 A1* | 6/2006 | Yamada | G02B 6/30 385/5 |
| 2006/0280405 A1 | 12/2006 | Gunn, III et al. | |
| 2010/0046889 A1 | 2/2010 | Peng | |
| 2011/0150386 A1 | 6/2011 | Dupuis et al. | |
| 2013/0195400 A1* | 8/2013 | Miyazaki | G02B 6/125 385/14 |
| 2016/0246009 A1* | 8/2016 | Jiang | G02B 6/124 |

OTHER PUBLICATIONS

Hirohito Yamada et al., "Vertical-coupling optical interface for on-chip optical interconnection", Optics Express, vol. 19, No. 2, Jan. 2011, 6 pages.

International Search Report and Written Opinion mailed Jan. 16, 2017 for International Application No. PCT/US2016/063423, 10 pages.

Siitonen et al., "A double-sided grating coupler for thin light guides," Optical Society of America, (2007), 11 pages.

* cited by examiner

DOUBLE-SIDED ORTHOGONAL GRATING OPTICAL COUPLER

FIELD

Embodiments of the present disclosure generally relate to the field of optoelectronics and, more particularly, to orthogonal optical couplers for photonics circuits such as silicon photonics transmission circuits fabricated on silicon-on-insulator (SOI) wafers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Silicon photonics is often considered one of the most popular and successful technology platforms based on planar photonics circuits for cost effective optoelectronics integration. Optical waveguide-based photonics devices such as lasers, modulators, and detectors are typically fabricated on silicon-on-insulator (SOI) wafers. In SOI photonic systems, light is typically confined in a wafer (or chip) plane. Silicon waveguides are typically designed with sub-micron cross-sections, allowing dense integration of active and passive devices to achieve higher speed and lower driving power. Light transmitted from silicon SOI photonic systems is typically coupled off-chip in a non-vertical fashion. In some manufacturing scenarios, it is desirable to vertically couple light from silicon photonic transmitter chips to optical fibers in a direction orthogonal to the silicon photonic transmitter chip. However, orthogonal light emission from grating couplers, vertical in particular, typically has severely limited performance due to large back-reflection and/or losses resulting from higher order diffraction such that when grating couplers are used they have been restricted to non-orthogonal/non-vertical light emission that is typically greater than five to ten degrees from a vertical direction orthogonal to the chip to suppress higher order diffraction either along the return path or off-chip.

BRIEF DESCRIPTION OF THE DRAWINGS

Embodiments of the orthogonal optical coupling techniques of the present disclosure may overcome this limitation. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
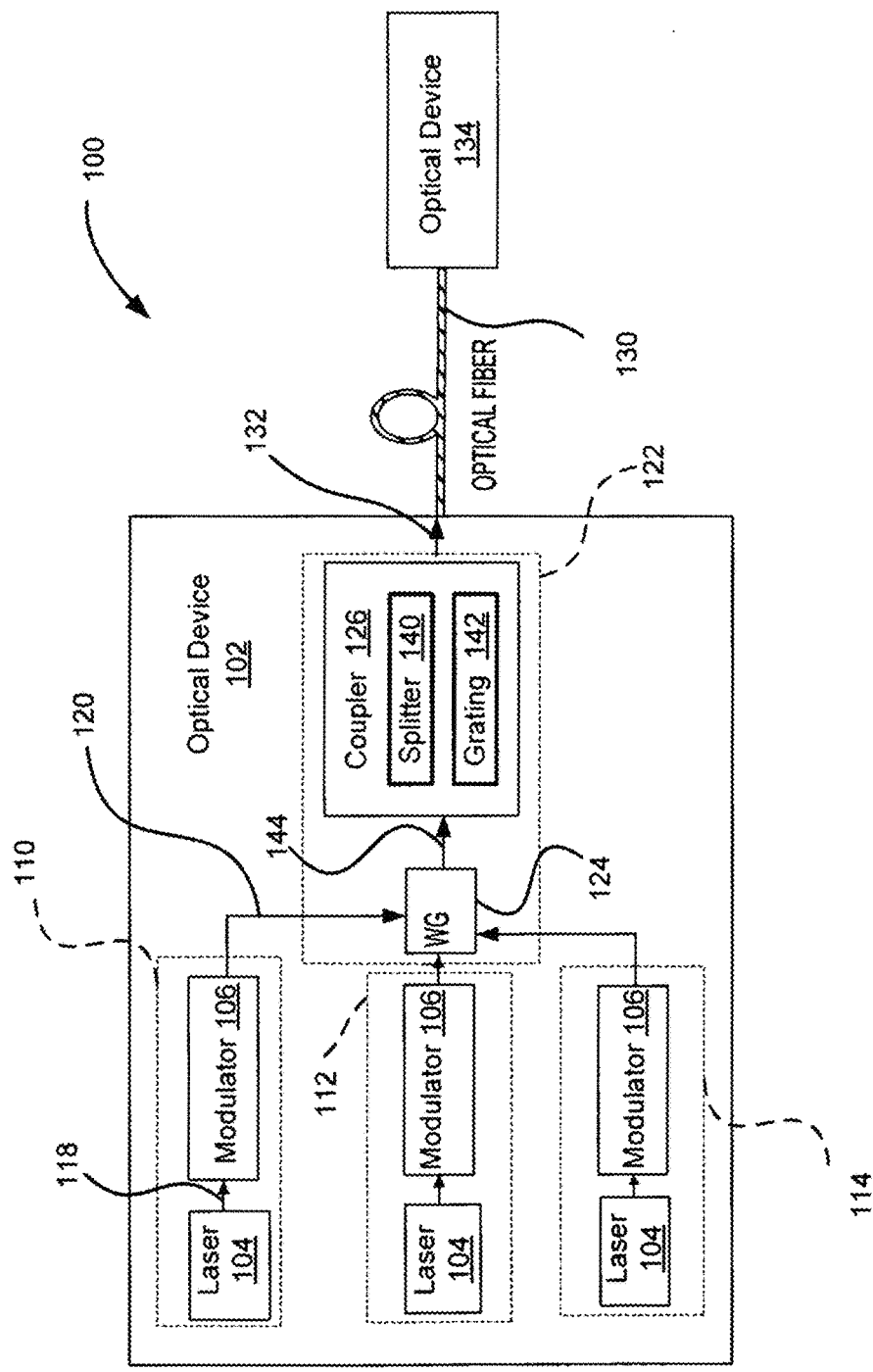
FIG. 1 is a block diagram of an optoelectronic system incorporated with a double-sided orthogonal grating optical coupler of the present disclosure, according to various embodiments.

Embodiments of the present disclosure describe techniques and configurations for an optical device configured to provide orthogonal, e.g., vertical, optical coupling of light transmitted from a photonics device such as a silicon photonics transmitter chip in a direction normal to the chip. The device may include a splitter and a grating. The splitter may split light from a light source into a first path and a second path. The grating may receive light from the first path at a first side and light from the second path at a second side opposite the first side such that the grating transmits diffracted light from the first and second path in an orthogonal, e.g., vertical, direction into a single mode fiber, a multi-mode fiber, or free space.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an optoelectronic system 100 that may include an optical coupler configured with a splitter to split incoming light from a waveguide into a first path and a second path that are each coupled with a grating to orthogonally, e.g., vertically, transmit light as described herein, in accordance with some embodiments. The optoelectronic system 100 may be used to transmit an optical signal modulated with a data signal via an optical fiber, for example, between racks in a data center, or long-distance, between data storage facilities, data centers, and the like. For ease of understanding, the remainder of the description will be primarily presented in terms of a grating to vertically transmit light, relative to a horizontally placed plane of a photonic chip that includes the grating. However, the description is not to be read as limiting. The present disclosure may be practiced with a grating to orthogonally transmit light relative to a plane that includes one or more waveguides optically coupled with the grating.

The optoelectronic system 100 may include an optical apparatus (device) 102 having one or more light sources (e.g., laser devices) 104 to provide a light signal 118 (e.g., constant light intensity signal) to a respective modulator 106 to modulate input light according to a data signal to be transmitted. Each combination of the light source 104 and corresponding modulator 106 may comprise a communication channel 110, 112, 114. The modulator 106 may output a modulated optical signal 120 to a multiplexer (not shown), where the signal may be input to an optical coupling assembly 122 having a waveguide 124 and an optical coupler, such as a double-sided vertical grating optical coupler (DVGOC) 126. Alternatively, one or more signals (e.g., 120) from one or more communication channels 110, 112, and 114 may be directly input to the optical coupling assembly 122 without being multiplexed. In some embodiments, a single light source and communication channel may be used and/or light from a light source may be directed through the waveguide 124 without being modulated by a modulator. In various embodiments, one or more components of the DVGOC 126 may be a component of or coupled with a photonic chip such as a silicon photonic transmitter chip. In various embodiments, one or more components of the DVGOC 126 may lie in a plane of the photonic chip that may be described as a horizontal plane, and the DVGOC 126 may emit light in a vertical direction relative to the horizontal plane.

The optical coupling assembly 122, with the DVGOC 126, may provide an interface from the channels 110, 112, 114 to an optical communication channel (e.g., optical fiber cable or other configuration that may include coupling optics followed by fiber) 130 and may be configured to transfer an optical signal 132 to the optical communication channel 130, to be received by another optical device 134. In embodiments, the optical waveguide 124 may comprise a silicon-on-insulator (SOI)-based optical waveguide. The DVGOC 126 may include a splitter 140 configured to split light from the waveguide 124 into a first path and a second path such that a grating 142 receives light from the first path at a first side and light from the second path at a second side opposite the first side. In various embodiments, the splitter 140 may be a 1×2 multi-mode interference (MMI) device, a Y-type splitter, a 2×2 MMI device, a directional coupler or any other suitable device to split the light from the waveguide 124 into the first path and the second path. In some embodiments, the light may be split into the first path and the second path with a very low loss of less than 0.1 dB. Other loss values during splitting may be present in various embodiments. In some embodiments, the splitter may be selected or designed to minimize back-reflection at a given wavelength of operation such as for applications where it is desirable to minimize back-reflection in addition to or rather than minimizing loss. In some embodiments, the first path and the second path may lie in a plane and the grating 142 may transmit light from the DVGOC 126 in an orthogonal, e.g., vertical, relationship to the plane of the first and second paths. In embodiments, the plane may also include the optical waveguide 124 and/or the grating 142.

In embodiments, during operation, the light from the first path and the second path may interfere at the grating 142 constructively to diffract light vertically off-chip in a direction normal or orthogonal to the chip with low loss and destructively in a backward direction to suppress back-reflection. In some embodiments, the loss may be approximately 1.5 dB and the return loss (RL) may be less than −15 dB. Different loss and/or RL values may be present in other embodiments.

When a conventional single-sided grating is used in an optical coupler, light diffracts into one or more orders. Typically, the first order diffraction is designed to couple off-chip, while higher order diffraction is undesirable, leads to high losses, and may couple backwards into the waveguide leading to high back-reflection. In embodiments, use of a double-sided grating, such as the grating 142, may cancel the higher order diffraction through interference that occurs within the grating. In embodiments, the grating length and geometry may be selected such that the grating operates in a critically coupled (or near critically coupled) regime rather than an under-coupled or over-coupled regime. In embodiments, two of the parameters that may affect the regime in which the grating operates are the diffraction strength (e.g., diffracted power loss per unit length) and the total length of the grating. If the diffraction strength and/or length of the grating are small, the double-sided grating is likely to operate in the under-coupled regime. In the under-coupled regime, the diffraction from both sides of the grating is weak and there is not a sufficient amount of interaction between the forward and backward diffracted waves from either side of the grating to enable complete cancellation of back-reflection. In the over-coupled regime, the diffraction strength and/or length of the grating is large enough that the light diffracts too fully before it can interfere with light from the opposing side of the grating. With maximum over-coupling, the double-sided grating is equivalent to two separate gratings. At or near the critical coupling regime, the diffraction strength and/or grating length may be designed to minimize both under and over-coupling. In this regime, the light from both sides of the grating has sufficient opportunity to interfere, constructively in the off-chip direction and destructively in the backward direction. In embodiments, an optimal grating length for a given grating geometry (and diffraction strength) may be identified by simulating a range of grating lengths and identifying the length that maximizes off-chip coupling and/or minimized back-reflection, giving an indicator of operation near the critical coupling regime.

The DVGOC 126, with the splitter 140 and the grating 142, may be configured to transform a light signal 144 propagating through the waveguide 124 into the optical signal 132 to vertically couple with the optical communication channel 130, as described more fully below. In some embodiments, the DVGOC 126 may include one or more phase shifters (not shown in FIG. 1, see FIG. 2) and/or one or more mode converters (not shown in FIG. 1, see FIG. 2). The optical assembly 122 may include additional components such as a tap waveguide, a photodetector, and a phase controller (all not shown in FIG. 1, see FIG. 2) in embodiments where dynamic phase shifting may be performed. In some embodiments, the optical communication channel 130 may not be present and the DVGOC 126 may transmit the light into free space rather than an optical fiber or other optical communication channel 130.

Figure 2:
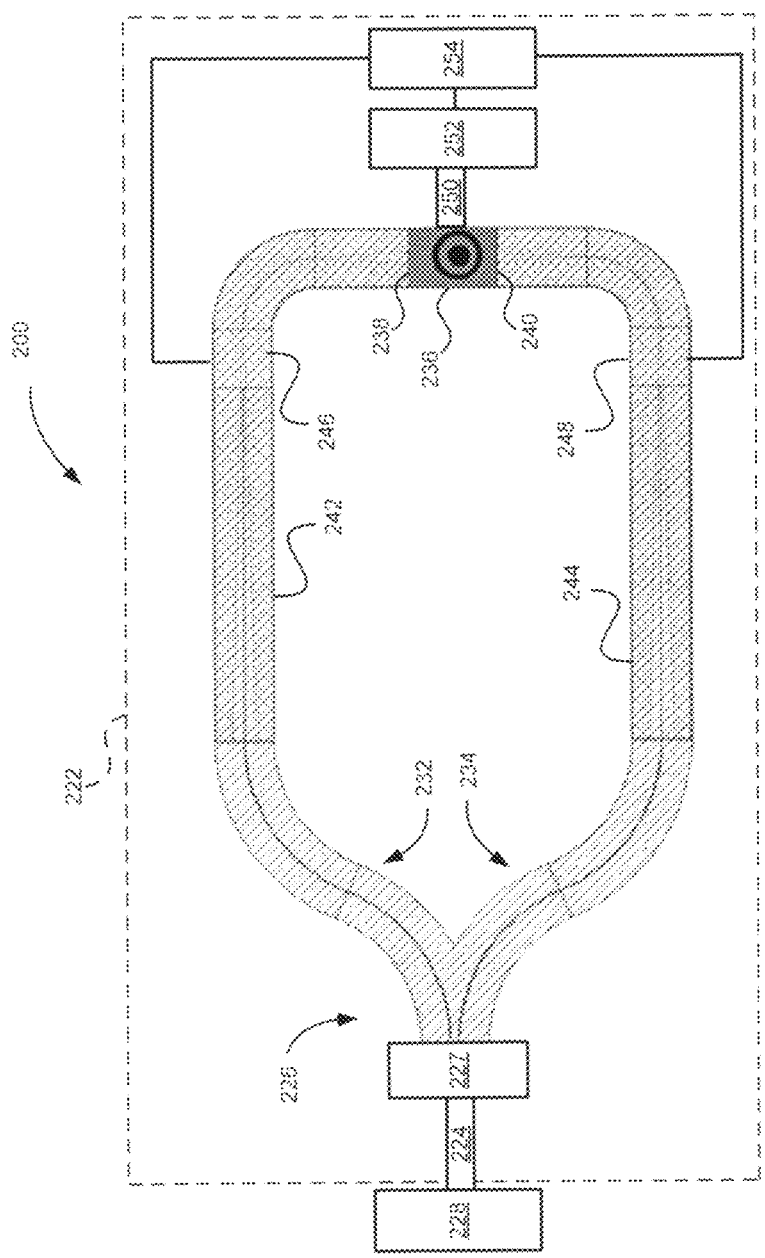
FIG. 2 is a diagram of an optical device showing additional detail for a double-sided orthogonal grating optical coupler, according to various embodiments.

FIG. 2 is a block diagram of an example optical device 200 (similar to device 102) depicting an optical assembly 222 (e.g., similar to optical assembly 122) in greater detail, in accordance with some embodiments. As shown, the optical assembly 222 may include an optical waveguide 224 and an optical coupler 226 that in various embodiments may be a double-sided vertical grating optical coupler (e.g., similar to DVGOC 126). In various embodiments, one or more components of the optical assembly 222 may be implemented on a photonics chip such as a silicon or SOI chip. In various embodiments, the optical assembly 222 may include a silicon waveguide and/or other components formed of SOI, an optical nitride such as silicon nitride or aluminum nitride, indium phosphide or other type III-V materials, gallium nitride, tantalum oxide, or germanium for example. The optical assembly 222 may be coupled to a communication channel 228 at a first end of the waveguide 224, according to some embodiments. The communication channel 228 may be similar to one or more of the communication channels 110, 112, or 114 in some embodiments and may include one or more light sources such as a laser.

In various embodiments, the optical coupler 226 may include a splitter 227 that may split light from the waveguide 224 into a first path 232 that travels in a waveguide of a first arm and a second path 234 that travels in a waveguide of a second arm. In some embodiments, the light from the waveguide 224 may have a wavelength of approximately 1310 nanometers (nm), but the wavelength of the light may be different in other embodiments. The splitter 227 may be a 1×2 MMI device, a Y-type splitter, a directional coupler or another suitable splitting device. In some embodiments, the splitter 227 may be a 2×2 MMI device, with an open input port of the 2×2 MMI device used to receive channeled back-reflected light that would otherwise be lost to radiation modes and scattering. The optical coupler 226 may also include a grating 236 that may be similar to the grating 142, and may receive light from the first path 232 at a first side 238 and light from the second path 234 at a second side 240 opposite the first side 238. The grating 236 may be a diffraction grating with a sub-micron period with a duty cycle between 10% and 90% in various embodiments, and may be in a range from 30% to 70% in some embodiments. In various embodiments, the grating 236 may have approximately 40 grating lines. In other embodiments, the grating 236 may have a number of grating lines from approximately five grating lines to several hundred grating lines. However, different numbers of grating lines or other grating characteristics may be outside one or more of these ranges in other embodiments.

In various embodiments, the grating 236 may transmit diffracted light from the first path 232 and the second path 234 in a vertical direction normal to a chip that may include the grating 236 into a single mode fiber, a multi-mode fiber, or free space. In embodiments, the single mode fiber may have a mode-field diameter of approximately 9.2 micrometers. Single mode fibers with other diameters or characteristics may be used in other embodiments. As shown, the vertical direction from the grating 236 is out of the page in a direction normal or orthogonal to a plane of a chip that may include the grating 236 and other components of the optical coupler 226 in some embodiments. In various embodiments, optimal operation of the grating 236 may occur when there is constructive interference of the light from each arm. When a zero degree phase difference is present at the grating 236 between light traveling in the first path 232 and the second path 234 from the two arms, a transmission loss of approximately 1.8 dB may be present in various embodiments. As the phase difference increases between the two arms, there may be greater transmission loss. In some embodiments, an accumulated phase in each arm may be given by the following equation:

$$\Phi = \int \frac{2\pi}{\lambda} n_{\it eff}(l) dl \quad (1)$$

In equation (1), $\lambda$ is the wavelength of the light and $n_{\it eff}$ is the effective refractive index at a given point along the length (l) of the arm. The accumulated phase shifts in the first and second arms may be represented by $\Delta\Phi_1$ and $\Delta\Phi_2$ respectively. Even in cases where both arms are designed to have the same length, a net phase error may occur between the two arms due to differing effective refractive indices over the path length of each arm. In SOI systems, for example, $n_{\it eff}$ may be quite high (e.g., approximately 2 to 3.5). In various embodiments, to ensure stable, low loss operation within less than 0.5 dB of maximum transmission where there is near-zero phase difference, the net phase difference between the two arms may be kept to less than approximately n/4 (45 degrees) with one or more phase shifters in one or more of the arms. In some embodiments, phase shifters may not be present and other techniques may be used to reduce the net phase difference between the two arms such as by using a minimal path length in each arm or by designing the waveguide effective index to be robust to fabrication imperfections. In some embodiments, adiabatically widened waveguide tapers and/or bends may be used to pull the waveguide mode more into the core and away from dimensions more sensitive to fabrication imperfections to reduce the net phase difference.

In some embodiments, a first mode converter 242 may be located in the first path 232 and/or a second mode converter 244 may be located in the second path 234. A first phase shifter 246 may be located in the first path 232 and/or a second phase shifter 248 may be located in the second path 234 in some embodiments. The first phase shifter 246 and/or the second phase shifter 248 may be static phase shifters that may be set at the time of production of the optical device 200 in a calibration process, or may be dynamic phase shifters that may be dynamically adjustable according to various embodiments. In some embodiments, the first phase shifter 246 and/or the second phase shifter 248 may be formed of an ultraviolet (UV) curable material that changes its refractive index based on a degree of exposure to UV light. In various embodiments the first phase shifter 246 and/or the second phase shifter 248 may be an electro-optic device such as waveguide integrated diodes or capacitors, or a heater such as a narrow wire tungsten or aluminum heater. In some embodiments, a calibration through automated wafer level testing prior to device packaging may be performed to establish a setting for a static phase shifter.

In some embodiments, where one or more of the first phase shifter 246 or the second phase shifter 248 is a dynamic phase shifter, the optical device 200 may include a tap waveguide 250 optically coupled with the grating 236 to receive a portion of the light transmitted or reflected by the grating 236. A photodetector 252 may be coupled with the tap waveguide 250 to detect an amount of light transmitted through the tap waveguide 250. A phase controller 254 may be coupled with the photodetector 252 and one or more of the first phase shifter 246 and the second phase shifter 248 to adjust the one or more phase shifters based at least in part on a signal generated by the photodetector 252.

In various embodiments, one or more dynamic phase shifters may be used to actively tune the optical coupler 226 to actively control transmission and/or back-reflection characteristics of the optical device 200. In some embodiments with one or more dynamic phase shifters, the optical coupler 226 may also be an optical modulator and the communication channel 228 may not include a modulator.

Figure 3:
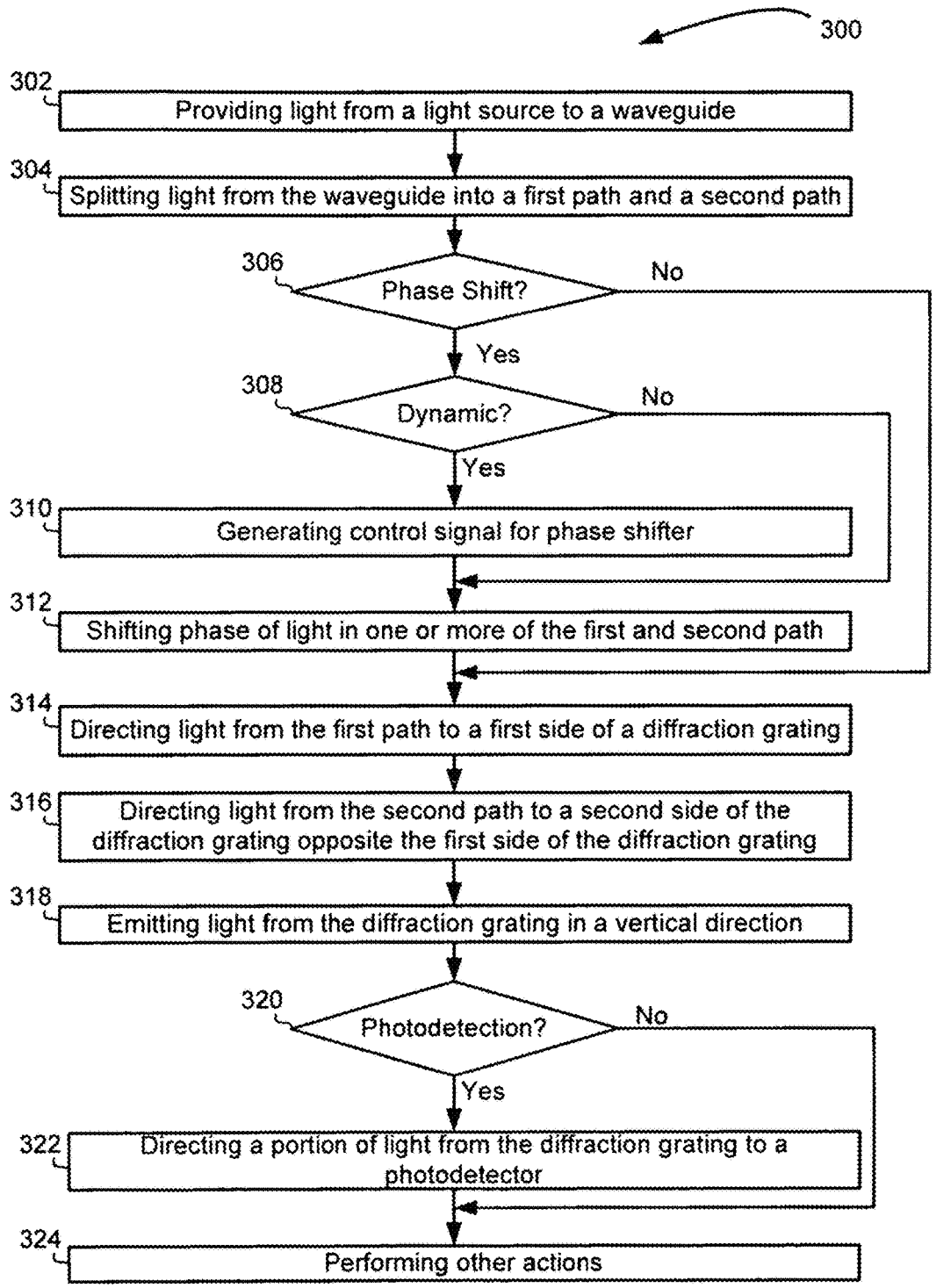
FIG. 3 is a flow diagram illustrating a method of optically coupling light from a light source, according to various embodiments.

FIG. 3 is a flow diagram illustrating a method 300 of optically coupling light from a light source, according to various embodiments. In embodiments, the method 400 may be practiced on the optical device 102 described with respect to FIG. 1 and/or the optical device 200 described with respect to FIG. 2.

At a block 302, the method 300 may include providing light from a light source to a waveguide along a horizontal plane. In some embodiments, the light may be modulated laser light from a communication channel such as communication channel 110, 112, or 114 described with respect to FIG. 1 or communication channel 228 described with respect to FIG. 2. The light may be provided from a laser light source such as the laser 104 in some embodiments.

At a block 304, the method 300 may include splitting the light from the waveguide into a first path and a second path. In some embodiments, a splitter such as the splitter 140 or the splitter 226 may be used to split the light into the first path and the second path. At a decision block 306, it may be determined whether a phase shift is to be performed. If a phase shift is to be performed, the method 300 may proceed to a decision block 308 where it may be determined whether the phase shift is a dynamic phase shift.

If the phase shift is a dynamic phase shift, the method 300 may proceed to a block 310 which may include generating one or more control signals for one or more phase shifters. In some embodiments, the control signal may be generated by a phase controller such as the phase controller 254 based at least in part on a signal from a photodetector such as the photodetector 252. At a block 312, the method 300 may include shifting a phase of light in one or more of the first and the second path. If, at the decision block 308, it was determined that the phase shift is not dynamic, the method 300 may also proceed to the block 312. In various embodiments, the phase shift may be performed by one or more of the first phase shifter 246 and the second phase shifter 248. In embodiments where the phase shift is dynamic, the phase shifters may shift the phase of the light in one or more of the first and the second path based at least in part on the control signal generated at the block 310. In embodiments, where the phase shift is static, the phase shifters may shift the phase of the light in one or more of the first and second path in a static manner based at least in part on a setting of the phase shifters that may have been performed during a calibration process at the time of production or assembly of the optical device 200 in some embodiments.

At a block 314, the method 300 may include directing light from the first path to a first side of the diffraction grating. If, at the decision block 306, it was determined that a phase shift is not to be performed, the method 300 may also proceed to the block 314. In some embodiments, the light may be directed to the first side of a diffraction grating such as the diffraction grating 236. In various embodiments, the light may pass through a mode converter such as the first mode converter 242 and/or a phase shifter such as the first phase shifter 246 when traveling from the splitter to the grating. In various embodiments, a mode converter and/or a phase shifter may not be present in the light path from the splitter to the grating.

At a block 316, the method 300 may include directing light from the second path to a second side of the diffraction grating opposite the first side of the diffraction grating. In some embodiments, the light may be directed to the second side of a diffraction grating such as the diffraction grating 236. In various embodiments, the light may pass through a mode converter such as the second mode converter 244 and/or a phase shifter such as the second phase shifter 248 when traveling from the splitter to the grating. In various embodiments, a mode converter and/or a phase shifter may not be present in the light path from the splitter to the grating.

At a block 318, the method 300 may include emitting light from the diffraction grating in a vertical direction normal or orthogonal to a photonic chip. In some embodiments, a beam profile of the emitted light may correspond to the beam profile 400 described with respect to FIG. 4. In other embodiments, the beam profile of the emitted light may be different than that of beam profile 400.

At a decision block 320, it may be determined whether photodetection is to be performed. If photodetection is to be performed, the method 300 may proceed to a block 322 that may include directing a portion of light from the diffraction grating to a photodetector. In embodiments, the portion of light may be directed with a tap waveguide such as the tap waveguide 240. In various embodiments, a photodetector such as the photodetector 252 may receive the portion of light from the diffraction grating. In various embodiments, generating the control signal for a phase shifter at the block 310 may be performed based at least in part on a signal from the photodetector.

At a block 324, the method 300 may further include performing other actions such as directing the emitted light into a single mode fiber or a multi-mode fiber, or converting a mode of light passing through the first path and/or the second path, for example.

Figure 4:
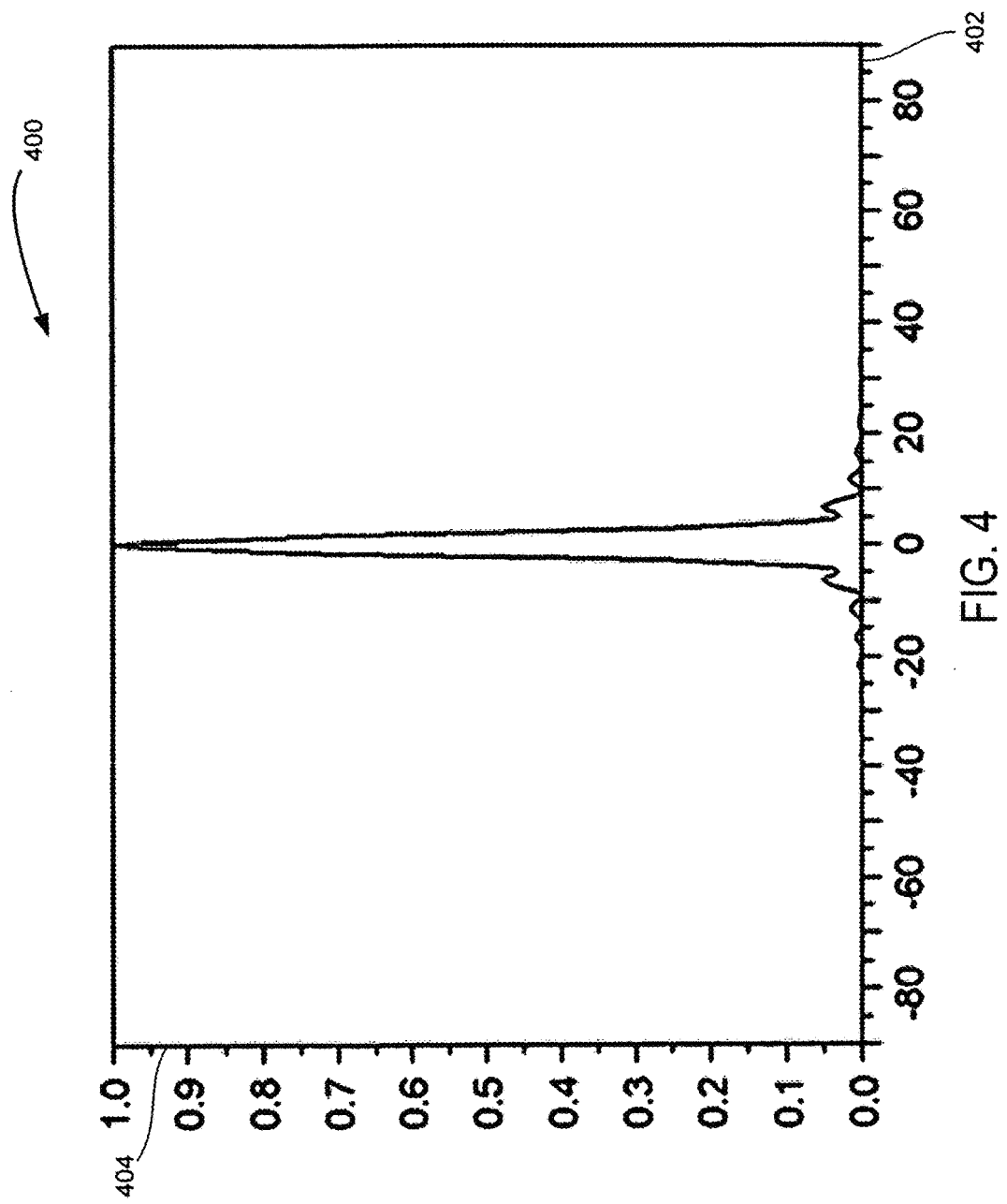
FIG. 4 illustrates a beam profile vertically emitted from a double-sided orthogonal grating optical coupler, according to various embodiments.

FIG. 4 illustrates a beam profile 400 vertically emitted from a double-sided vertical grating optical coupler, according to various embodiments. The beam profile shows a horizontal axis 402 representing a horizontal direction of an emitted beam in degrees. The full width at half minimum (FWHM) for the beam profile shown is 5.19666 degrees. A vertical axis 404 represents far field intensity in atomic units (a.u.). The beam profile 400 may represent a profile of a beam such as may be emitted from the grating 142 or the grating 236 according to various embodiments. In some embodiments, the beam profile may be symmetric. A high level of symmetry may be achieved by the symmetry of the double-sided grating, unlike one-sided gratings which require apodization to modify the beam profile. In some embodiments, a beam with a different profile and/or FWHM may be emitted. In various embodiments, the grating strength may be non-uniform along the length of the grating (e.g., the grating may be apodized, either symmetrically from both sides or asymmetrically) to tailor the beam profile. In embodiments, symmetric apodization may be used to optimize the shape of the beam profile to approximate a Gaussian and improve coupling.

Figure 5:
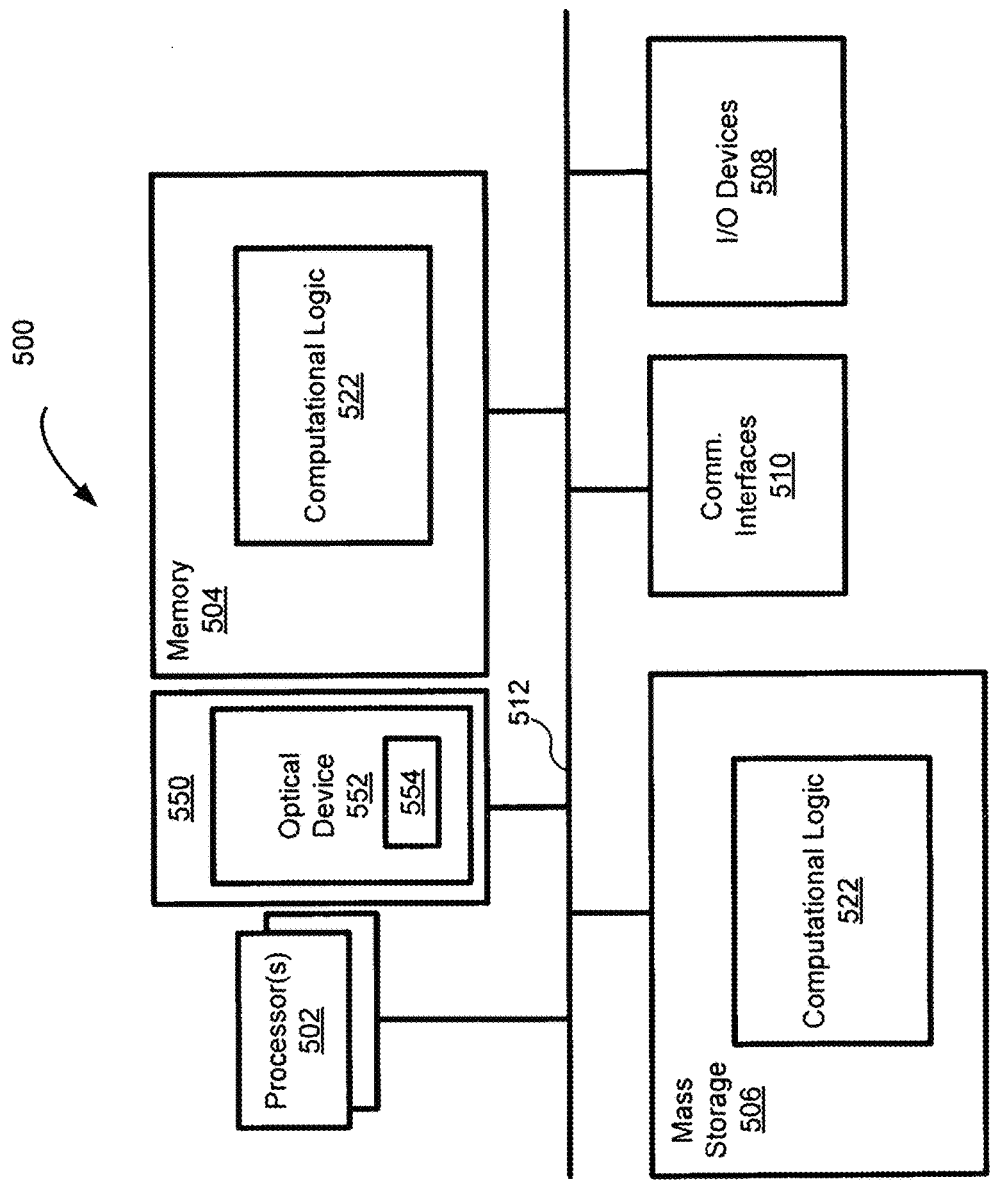
FIG. 5 schematically illustrates an example computing device and an optical device with a double-sided orthogonal grating optical coupler, according to various embodiments.

FIG. 5 illustrates an example computing device 500 suitable for use with various components and methods of FIGS. 1-3, such as optoelectronic system 100 including optical device 102 with DVGOC 126 described with respect to FIG. 1, or the optical device 200 described with respect to FIG. 2, in accordance with various embodiments. As shown, computing device 500 may include one or more processors or processor cores 502 and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor. The computing device 500 may include mass storage devices 506 (such as diskette, hard drive, volatile memory (e.g., dynamic random-access memory (DRAM), compact disc read-only memory (CD-ROM), digital versatile disk (DVD), and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 500 may further include input/output devices 508 (such as a display (e.g., a touchscreen display), keyboard, cursor control, remote control, gaming controller, image capture device, and so forth) and communication interfaces 510 (such as network interface cards, modems, infrared receivers, radio receivers (e.g., Bluetooth), and so forth). The computing device 500 may include an optoelectronic system 550 that may include an optical device 552 with a DVGOC 554. In various embodiments, the optoelectronic system may be configured similarly to the optoelectronic system 100, the optical device 552 may be configured similarly to the optical apparatus 102 or the optical device 200, and/or the DVGOC 554 may be configured similarly to the DVGOC 126 or the optical coupler 226.

The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions for the operation of various components of computer system 500, including but not limited to the operation of the optical device 102 of FIG. 1, the phase controller 254 of FIG. 2, an operating system of computer system 500, and/or one or more applications. The various elements may be implemented by assembler instructions supported by processor(s) 502 or high-level languages that may be compiled into such instructions.

The permanent copy of the programming instructions may be placed into mass storage devices 506 in the factory or in the field through, for example, a distribution medium (not shown), such as a compact disc (CD), or through communication interface 1910 (from a distribution server (not shown)). That is, one or more distribution media having an implementation of the agent program may be employed to distribute the agent and to program various computing devices.

The number, capability, and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 504 may include computational logic 522 configured to practice aspects of embodiments, such as those involving optical device 102, including the DVGOC 126 or optical coupler 226, as described in reference to FIGS. 1-4. For some embodiments, at least one of processors 502 may be packaged together with computational logic 522 configured to practice aspects of embodiments described herein to form a System in Package (SiP) or a System on Chip (SoC).

The computing device 500 may include or otherwise be associated with an optoelectronic system that may include components and/or implement methods described with respect to FIGS. 1-4., such as system 100, implementing aspects of the optical device 102, including the DVGOC 126 or optical coupler 226 as described above, and in particular the embodiments of the optical coupler described in reference to FIGS. 1-4. In some embodiments, at least some components of the optoelectronic system 100 (e.g., optical device 102) may be communicatively coupled with the computing device 500 and/or be included in one or more of the computing device 500 components, such as communication interfaces 510, for example. In some embodiments, one or more components such as processor 502 may be included as a part of the optoelectronics system 100, such as in a phase controller (e.g., phase controller 254).

In various implementations, the computing device 500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 500 may be any other electronic device that processes data.

Figure 6:
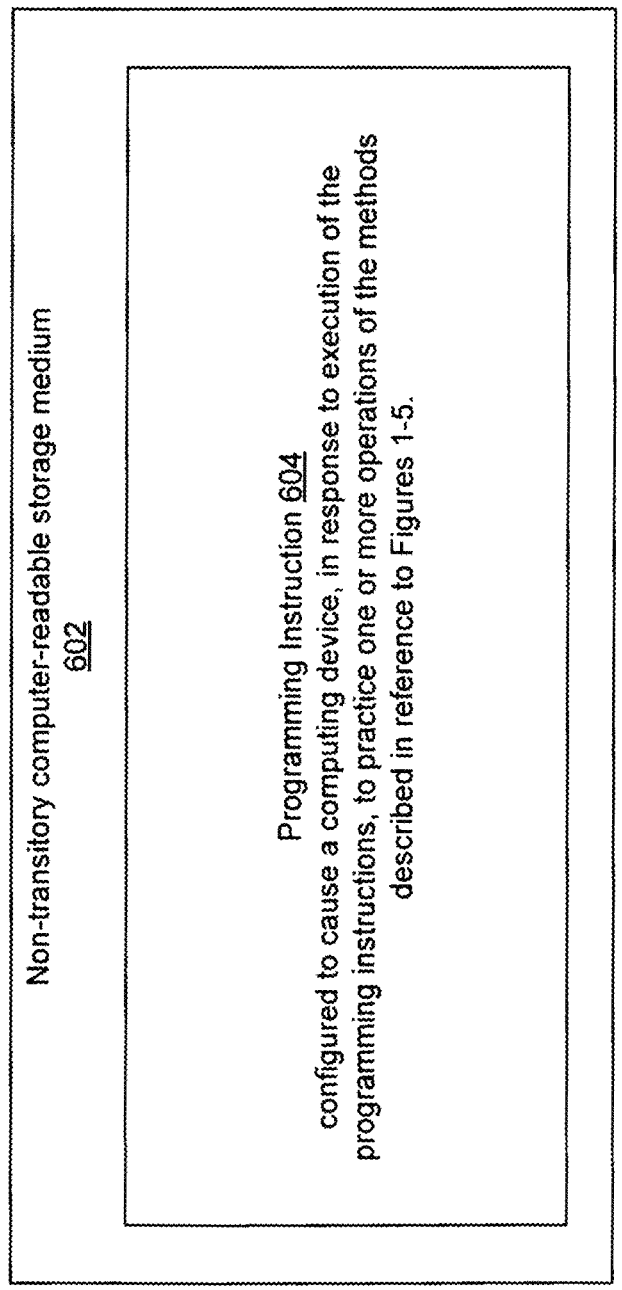
FIG. 6 illustrates an example storage medium with instructions configured to enable a computing device to practice the present disclosure, according to various embodiments.

FIG. 6 illustrates an example non-transitory computer-readable storage medium having instructions configured to practice all or selected ones of the operations associated with optoelectronics system 100, optical apparatus 102, optical device 200, phase controller 254 and/or other devices or methods described with respect to FIGS. 1-5, in accordance with various embodiments. As illustrated, non-transitory computer-readable storage medium 602 may include a number of programming instructions 604. Programming instructions 604 may be configured to enable a device, e.g., computing device 500, in response to execution of the programming instructions, to perform one or more operations of the processes described in reference to FIGS. 1-4. For example, the programming instructions 604 may be configured to enable a phase controller such as the phase controller 254 in the optoelectronics system 100, the optical apparatus 102, or the optical device 200 to dynamically adjust one or more phase shifters to adjust a phase of light in one or more transmission paths based at least in part on a signal from a photodetector such as the photodetector 252. In alternate embodiments, programming instructions 604 may be disposed on multiple non-transitory computer-readable storage media 602 instead. In still other embodiments, programming instructions 604 may be encoded in transitory computer-readable signals.

Referring back to FIG. 5, for one embodiment, at least one of processors 502 may be packaged together with computational logic 522 (in lieu of storing in memory 504 and/or mass storage 506) configured to perform one or more operations of the processes described with reference to FIGS. 1-4. For one embodiment, at least one of processors 502 may be packaged together with computational logic 522 configured to practice aspects of the methods described in reference to FIGS. 1-4 to form a System in Package (SiP). For one embodiment, at least one of processors 502 may be integrated on the same die with computational logic 522 configured to perform one or more operations of the processes described in reference to FIGS. 1-4. For one embodiment, at least one of processors 502 may be packaged together with computational logic 522 configured to perform one or more operations of the process described in reference to FIGS. 1-4 to form a System on Chip (SoC). Such a SoC may be utilized in any suitable computing device.

For the purposes of this description, a computer usable or computer-readable medium can be any apparatus that can contain, store, communicate, propagate, or transport the program for use by or in connection with an instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W), and digital video disk (DVD).

Figure 7:
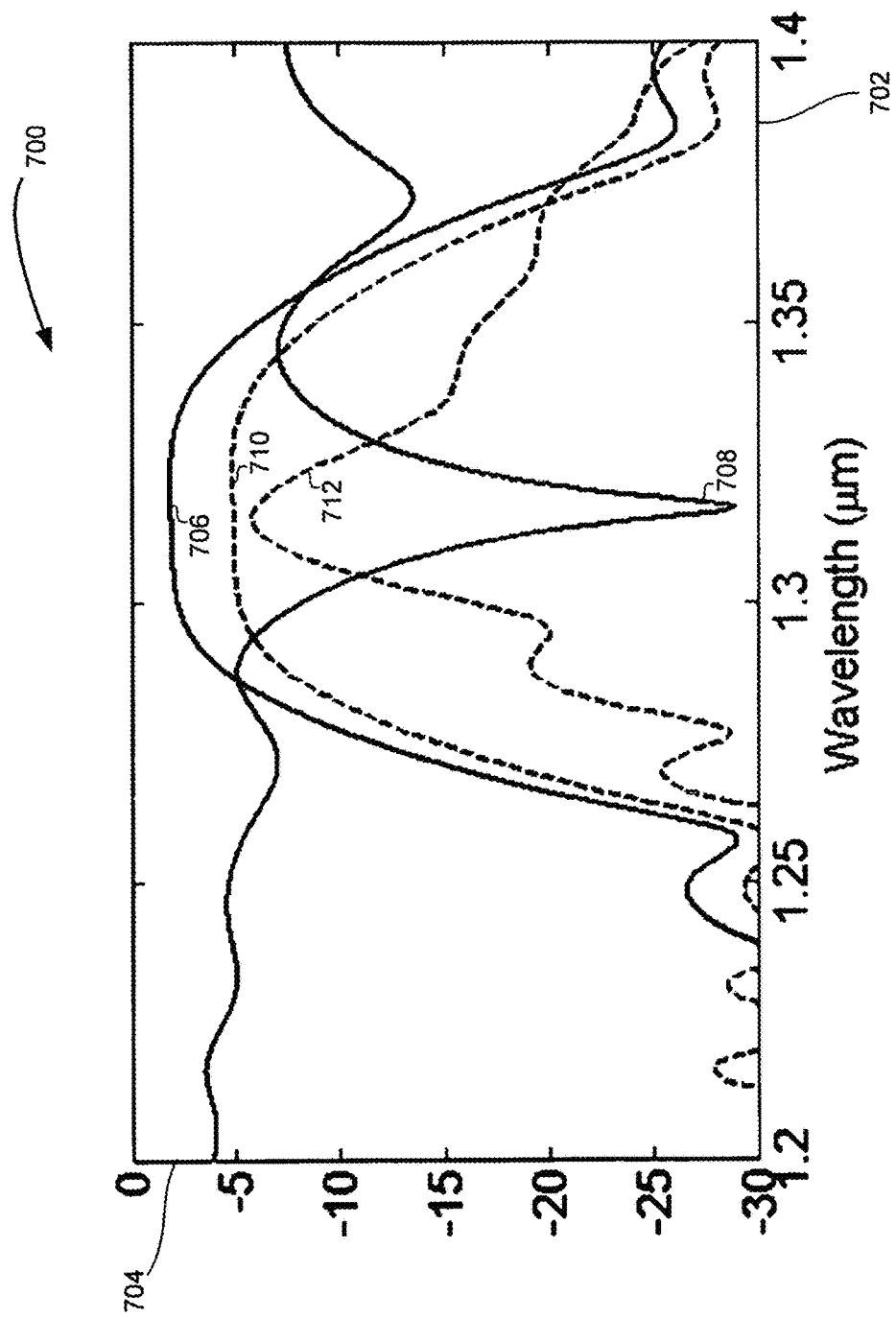
FIG. 7 illustrates a simulated spectral response of a double sided grating coupler according to various embodiments in comparison to a single sided grating coupler.

FIG. 7 illustrates a plot 700 of a simulated spectral response of a double sided grating according to various embodiments in comparison to a single sided grating coupler. In coupling to a single-mode fiber (SMF), the output field of conventional single-sided grating couplers suffers an intrinsic mode mismatch to the SMF due to the exponentially decaying field intensity along the grating. To improve the mode-matching, grating apodization is typically required. This generally requires the profile of the grating to change as a function of distance and can lead to increased pressure on fabrication capabilities to achieve the proper range of critical dimensions. In contrast to use of the single-sided grating couplers, the double-sided grating coupler in accordance with various embodiments may achieve good mode matching because the output field profile is the sum of two exponentially decaying field profiles. When these field profiles have the same magnitude and phase, they may add constructively to produce a symmetric profile with a shape that can be controlled by the diffraction strength and number of periods of the double-sided grating. Even without apodization, total coupling losses to a SMF of less than 2 dB may be achieved in some embodiments. This is demonstrated by the plot 700 where optical coupling to a standard SMF with a 9.2 micrometer mode-field diameter is simulated near the O-band. For a single-sided grating coupler, coupling loss to SMF is shown to be greater than 5 dB and back-reflection is shown to be similarly high at greater than −6 dB. For a double-sided grating coupler in accordance with various embodiments, total coupling loss is shown to be approximately 1.9 dB to SMF and back-reflection is shown to be less than −26 dB. This coupling loss is a combination of 1.5 dB insertion loss, owing primarily to a downward coupling (70% directivity), and 0.4 dB coupling loss penalty due to mode mismatch.

The plot 700 shows simulated forward coupling to a standard SMF and backward coupling (back-reflection). The plot 700 shows a horizontal axis 702 representing a wavelength of light in micrometers (μm). A vertical axis 704 represents forward/backward coupled power in dB. A first solid plot line 706 represents a double-sided grating coupler SMF transmission. A second solid plot line 708 represents a double-sided grating coupler silicon waveguide back-reflection. A first dashed plot line 710 represents a single-sided grating coupler SMF transmission. A second dashed plot line 712 represents a single-sided grating coupler silicon waveguide back-reflection.

The transmission of the example double-sided grating coupler embodiment has a peak wavelength range near 1310 nm, as shown by the first solid plot line 706. Other embodiments may be designed for other peak wavelengths. The back-reflection of the double-sided grating coupler shows a minimum near 1310 nm, as shown by the second solid plot line 708. Other embodiments may have a different magnitude minimum at a different wavelength. In various embodiments with the double-sided grating coupler, the minimum in the back-reflection wavelength that occurs may be close to the maximum in transmission wavelength, indicating operation near the critical coupling regime. This is different from use of a single-sided grating coupler that may operate in an over-coupled regime where the maximum back-reflection wavelength may coincide with or be near to the maximum transmission wavelength.

EXAMPLES

Example 1 may include an optical apparatus comprising: a splitter to split light from a light source into a first path and a second path; and a grating having a first side and a second side opposite the first side, wherein the grating is optically coupled with the splitter to receive light from the first path at the first side and light from the second path at the second side, wherein the grating is to transmit diffracted light from the first path and the second path in a direction orthogonal to a photonic transmitter chip into a single mode fiber, a multi-mode fiber, or free space.

Example 2 may include the subject matter of Example 1, further comprising: a first mode converter in the first path between the splitter and the grating to convert an initial first path mode area to a converted first path mode area; and a second mode converter in the second path between the splitter and the grating to convert an initial second path mode area to a converted second path mode area.

Example 3 may include the subject matter of any one of Examples 1-2, further comprising one or more phase shifters along one or more of the first path and the second path between the splitter and the grating to adjust a phase of light traveling in one or more of the first path and the second path.

Example 4 may include the subject matter of Example 3, wherein the one or more phase shifters have a static calibration phase shift.

Example 5 may include the subject matter of Example 3, wherein the one or more phase shifters are dynamically configurable.

Example 6 may include the subject matter of any one of Examples 1-5, further comprising an optical waveguide optically coupled with the splitter to transmit light input from the light source to the splitter.

Example 7 may include the subject matter of any one of Examples 1-6, wherein the splitter is one of a 1×2 multi-mode interference device, a Y-type splitter, a 2×2 multi-mode interference device, or a directional coupler.

Example 8 may include the subject matter of any one of Examples 1-7, wherein the light source is optically coupled with the apparatus and comprises a laser.

Example 9 may include the subject matter of any one of Examples 1-8, further comprising: a tap waveguide optically coupled with the grating; and a photodetector coupled with the tap waveguide.

Example 10 may include the subject matter of Example 9, further comprising: one or more phase shifters along one or more of the first path and the second path between the splitter and the grating to adjust a phase of light traveling in one or more of the first path and the second path; and a phase controller coupled with the one or more phase shifters and the photodetector, wherein the phase controller is to adjust the one or more phase shifters based at least in part on a signal from the photodetector.

Example 11 may include the subject matter of any one of Examples 9-10, wherein the tap waveguide is to receive a portion of light transmitted by the grating.

Example 12 may include the subject matter of any one of Examples 9-10, wherein the tap waveguide is to receive a portion of light reflected from the grating.

Example 13 may include a method of optically coupling light from a light source comprising: splitting light from a waveguide into a first path and a second path; directing light from the first path to a first side of a diffraction grating; directing light from the second path to a second side of the diffraction grating opposite the first side of the diffraction grating; and emitting light from the diffraction grating in a direction orthogonal to a photonic transmitter chip.

Example 14 may include the subject matter of Example 13, further comprising performing a first mode conversion of the light in the first path and a second mode conversion of the light in the second path.

Example 15 may include the subject matter of any one of Examples 13-14, further comprising performing a phase shift of light in one or more of the first and the second path.

Example 16 may include the subject matter of Example 15, further comprising setting a static phase shift value for performing the phase shift of the light in one or more of the first and the second path.

Example 17 may include the subject matter of Example 15, further comprising dynamically adjusting a phase shift value for performing the phase shift of the light in one or more of the first and the second path.

Example 18 may include the subject matter of any one of Examples 13-17, further comprising transmitting the orthogonally emitted light into one of a single mode fiber, a multi-mode fiber, or free space.

Example 19 may include the subject matter of any one of Examples 13-18, further comprising providing light from a laser light source to the waveguide.

Example 20 may include the subject matter of any one of Examples 13-19, further comprising directing a portion of light from the diffraction grating to a photodetector.

Example 21 may include the subject matter of Example 20, further comprising performing a phase shift of light in one or more of the first and the second path based at least in part on a signal from the photodetector.

Example 22 may include the subject matter of any one of Examples 20-21, wherein directing a portion of light from the diffraction grating to the photodetector includes directing a portion of light transmitted by the diffraction grating.

Example 23 may include the subject matter of any one of Examples 20-21, wherein directing a portion of light from the diffraction grating to the photodetector includes directing a portion of light reflected from the diffraction grating.

Example 24 may include an optical system comprising: a processor; and an optical device coupled with the processor, wherein the optical device includes: a splitter to split light from a light source into a first path and a second path; a grating having a first side and a second side opposite the first side, wherein the grating is to receive light from the first path at the first side and light from the second path at the second side; one or more phase shifters along one or more of the first path and the second path between the splitter and the grating to shift a phase of light traveling in one or more of the first path and the second path; and a phase controller coupled with the one or more phase shifters to adjust the one or more phase shifters based at least in part on a signal from the processor, wherein the grating is to transmit diffracted light from the first path and the second path in an orthogonal direction into a single mode fiber, a multi-mode fiber, or free space.

Example 25 may include the subject matter of Example 24 further comprising: a tap waveguide optically coupled with the grating; and a photodetector coupled with the tap waveguide and the phase controller, wherein the phase controller is to adjust the one or more phase shifters based at least in part on a signal from the photodetector.

Example 26 may include an optical apparatus comprising: means for splitting light from a waveguide into a first path and a second path; means for directing light from the first path to a first side of a diffraction grating; means for directing light from the second path to a second side of the diffraction grating opposite the first side of the diffraction grating; and means for emitting light from the diffraction grating in a direction orthogonal to a photonic transmitter chip.

Example 27 may include the subject matter of Example 26, further comprising: means for performing a first mode conversion of the light in the first path; and means for performing a second mode conversion of the light in the second path.

Example 28 may include the subject matter of any one of Examples 26-27, further comprising means for performing a phase shift of light in one or more of the first and the second path.

Example 29 may include the subject matter of Example 28, wherein the phase shift is a static phase shift value.

Example 30 may include the subject matter of Example 28, further comprising means for dynamically adjusting a phase shift value for performing the phase shift of the light in one or more of the first and the second path.

Example 31 may include the subject matter of any one of Examples 26-30, further comprising means for transmitting the orthogonally emitted light into one of a single mode fiber, a multi-mode fiber, or free space.

Example 32 may include the subject matter of any one of Examples 26-30, further comprising means for providing light from a laser light source to the waveguide.

Example 33 may include the subject matter of any one of Examples 26-31, further comprising means for directing a portion of light from the diffraction grating to a photodetector.

Example 34 may include the subject matter of Example 33, further comprising means for performing a phase shift of light in one or more of the first and the second path based at least in part on a signal from the photodetector.

Example 35 may include the subject matter of any one of Examples 33-34, wherein directing a portion of light from the diffraction grating to the photodetector includes directing a portion of light transmitted by the diffraction grating.

Example 36 may include the subject matter of any one of Examples 33-34, wherein directing a portion of light from the diffraction grating to the photodetector includes directing a portion of light reflected from the diffraction grating.

Example 37 may include the subject matter of any one of Examples 1-12, wherein: higher order diffracted light from the first path is to destructively interfere with light from the second path; and higher order diffracted light from the second path is to destructively interfere with light from the first path.

Example 38 may include the subject matter of Example 37, wherein the grating has a grating strength and a grating length that are coordinated to achieve a back-reflection of less than −15 dB.

Example 39 may include the subject matter of any one of Examples 1-12, wherein the first and second optical paths are symmetric to promote zero phase difference.

Example 40 may include the subject matter of any one of Examples 1-12, wherein the first and second optical paths have lengths coordinated to provide constructive interference of zero-th order diffraction.

Example 41 may include the subject matter of any one of Examples 1-12, wherein: first order diffracted light from the first path is to constructively interfere with light from the second path; and first order diffracted light from the second path is to constructively interfere with light from the first path.

Example 42 may include the subject matter of Example 41, wherein the grating has a grating strength and a grating length that are coordinated to achieve a transmission loss of less than 3 dB.

Example 43 may include the subject matter of Example 1, further comprising a phase shifter along the first path, wherein the second path does not include a phase shifter.

Example 44 may include the subject matter of Example 1, further comprising a phase shifter along the second path, wherein the first path does not include a phase shifter.

Example 45 may include the subject matter of any one of Examples 1-12, wherein the grating is non-uniform.

Example 46 may include the subject matter of any one of Examples 1-12, wherein the grating is apodized.

Example 47 may include the subject matter of any one of Examples 1-12, wherein the grating has a grating pitch that allows two diffraction orders to be excited.

Example 48 may include the subject matter of Example 47, wherein the grating has a grating pitch that allows only two diffraction orders to be excited.

Example 49 may include the subject matter of Example 48, wherein the two diffraction orders are an off-chip diffraction order and a higher order back-reflection.

Example 50 may include the subject matter of any one of Examples 1-12, wherein the grating has a grating pitch that allows more than two diffraction orders to be excited.

Example 51 may include the subject matter of any one of Examples 1-12, wherein the grating is comprised of one or more materials selected from silicon, silicon on insulator, an optical nitride, a type III-V material, gallium nitride, tantalum oxide, or germanium.

Example 52 may include the subject matter of Example 6, wherein the optical waveguide is comprised of one or more materials selected from silicon, silicon on insulator, an optical nitride, a type III-V material, gallium nitride, tantalum oxide, or germanium.

Example 53 may include the subject matter of Example 52, wherein the grating is comprised of the same one or materials as the optical waveguide.

Example 54 may include the subject matter of any one of Examples 1-12, wherein the grating is recessed into a waveguide.

Example 55 may include the subject matter of Example 54, wherein the grating is etched into the waveguide.

Example 56 may include the subject matter of any one of Examples 1-12, wherein the grating is raised above a waveguide.

Example 57 may include the subject matter of Example 56, wherein the grating is deposited above the waveguide.

Example 58 may include the subject matter of any one of Examples 1-12, wherein the grating is both recessed into and raised above a waveguide.

Example 59 may include the subject matter of Example 1, wherein the first path and the second path are strictly single mode.

Example 60 may include the subject matter of Example 3, wherein the first path and the second path are strictly single mode.

Example 61 may include the subject matter of any one of Examples 9-12, wherein the splitter is a 2×2 multi-mode interference device that is also configured as the tap waveguide.

Example 62 may include the subject matter of Example 7, wherein the splitter is a 2×2 multi-mode interference device configured to receive channeled back-reflected light.

Example 63 may include the subject matter of any one of Examples 1-12, wherein the first path and the second path have different physical lengths, but are coordinated to provide constructive interference of zero-th order diffraction.

Example 64 may include the subject matter of Example 63, wherein the lengths of the first path and the second path are coordinated to achieve a phase difference of a multiple of a wavelength of light traveling along the first path and the second path.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

What is claimed is:

1. An optical apparatus comprising:
   a splitter formed on a surface of a photonic transmitter chip to split light from a light source into a first path and a second path;
   a grating having a first side and a second side opposite the first side, wherein the grating is optically coupled with the splitter to receive light from the first path at the first side and light from the second path at the second side, wherein the grating is configured to transmit diffracted light from the first path and the second path in a direction orthogonal to the surface of the photonic transmitter chip into a single mode fiber, a multi-mode fiber, or free space;
   a tap waveguide formed on the surface of the photonic transmitter chip and optically coupled with the grating, wherein the tap waveguide is configured to receive a portion of light reflected from the grating; and
   a photodetector coupled with the tap waveguide.

2. The optical apparatus of claim 1, further comprising:
   a first mode converter in the first path between the splitter and the grating to convert an initial first path mode area to a converted first path mode area; and
   a second mode converter in the second path between the splitter and the grating to convert an initial second path mode area to a converted second path mode area.

3. The optical apparatus of claim 1, further comprising one or more phase shifters along one or more of the first path and the second path between the splitter and the grating to shift a phase of light traveling in one or more of the first path and the second path.

4. The optical apparatus of claim 3, wherein the one or more phase shifters have a static calibration phase shift.

5. The optical apparatus of claim 3, wherein the one or more phase shifters are dynamically configurable.

6. The optical apparatus of claim 1, further comprising an optical waveguide optically coupled with the splitter to transmit light input from the light source to the splitter.

7. The optical apparatus of claim 1, wherein the splitter is one of a 1×2 multi-mode interference device, a Y-type splitter, a 2×2 multi-mode interference device, or a directional coupler.

8. The optical apparatus of claim 1, wherein the light source is optically coupled with the apparatus and comprises a laser.

9. The optical apparatus of claim 1, further comprising:
   one or more phase shifters along one or more of the first path and the second path between the splitter and the grating to shift a phase of light traveling in one or more of the first path and the second path; and
   a phase controller coupled with the one or more phase shifters and the photodetector, wherein the phase controller is to adjust the one or more phase shifters based at least in part on a signal from the photodetector.

10. The optical apparatus of claim 1, wherein the splitter is configured as the tap waveguide.

11. The optical apparatus of claim 10, wherein the splitter is a 2×2 multi-mode interference device configured to receive channeled back-reflected light from the grating.

12. The optical apparatus of claim 1, wherein the grating has a grating pitch that allows only two diffraction orders to be excited.

13. A method of optically coupling light from a light source comprising:
   splitting light from a waveguide formed on a surface of a photonic transmitter chip into a first path and a second path;
   directing light from the first path to a first side of a diffraction grating;
   directing light from the second path to a second side of the diffraction grating opposite the first side of the diffraction grating; and
   emitting light from the diffraction grating in a direction normal to the surface of the photonic transmitter chip; and
   directing a portion of light from the diffraction grating to a photodetector, wherein directing a portion of light from the diffraction grating to the photodetector includes directing a portion of light reflected from the diffraction grating.

14. The method of claim 13, further comprising performing a first mode conversion of the light in the first path and a second mode conversion of the light in the second path.

15. The method of claim 13, further comprising performing a phase shift of light in one or more of the first and the second path.

16. The method of claim 15, further comprising setting a static phase shift value for performing the phase shift of the light in one or more of the first and the second path.

17. The method of claim 15, further comprising dynamically adjusting a phase shift value for performing the phase shift of the light in one or more of the first and the second path.

18. The method of claim 13, further comprising transmitting the emitted light into one of a single mode fiber, a multi-mode fiber, or free space.

19. The method of claim 13, further comprising providing light from a laser light source to the waveguide.

20. The method of claim 13, further comprising performing a phase shift of light in one or more of the first and the second path based at least in part on a signal from the photodetector.

21. The method of claim 13, wherein splitting light from a waveguide into a first path and a second path includes splitting light at a splitter, and wherein directing a portion of light reflected from the diffraction grating to the photodetector includes directing back-reflected light received at the splitter from the diffraction grating to the photodetector.

22. An optical system comprising:
a processor;
an optical device coupled with the processor, wherein the optical device includes:
 a splitter formed on a surface of a photonic transmitter chip to split light from a light source into a first path and a second path;
 a grating having a first side and a second side opposite the first side, wherein the grating is configured to receive light from the first path at the first side and light from the second path at the second side;
 one or more phase shifters along one or more of the first path and the second path between the splitter and the grating to shift a phase of light traveling in one or more of the first path and the second path; and
 a phase controller coupled with the one or more phase shifters to adjust the one or more phase shifters based at least in part on a signal from the processor, wherein the grating is configured to transmit diffracted light from the first path and the second path in a direction orthogonal to the surface of the photonic transmitter chip into a single mode fiber, a multi-mode fiber, or free space;
 a tap waveguide optically coupled with the grating, wherein the tap waveguide is to receive a portion of light reflected from the grating; and
 a photodetector coupled with the tap waveguide and the phase controller, wherein the phase controller is to adjust one or more phase shifters based at least in part on a signal from the photodetector.

23. The optical system of claim 22, wherein the splitter is configured as the tap waveguide.

24. The optical system of claim 22, wherein the splitter is a 2×2 multi-mode interference device configured to receive channeled back-reflected light from the grating.

25. The optical system of claim 22, wherein the grating has a grating pitch that allows only two diffraction orders to be excited.

* * * * *